United States Patent
Blette et al.

(10) Patent No.: US 9,611,122 B2
(45) Date of Patent: Apr. 4, 2017

(54) FILAMENT DISPENSER

(75) Inventors: Russell E. Blette, Saint Paul, MN (US); Arthur V. Lang, Saint Paul, MN (US); Timothy J. Pommer, Saint Paul, MN (US); Dale R. Wiehe, Saint Paul, MN (US)

(73) Assignee: Scientific Anglers LLC, Sunderland, VT (US)

( * ) Notice: Subject to any disclaimer, the term of this patent is extended or adjusted under 35 U.S.C. 154(b) by 419 days.

(21) Appl. No.: 14/125,433

(22) PCT Filed: Jun. 11, 2012

(86) PCT No.: PCT/US2012/041866
§ 371 (c)(1),
(2), (4) Date: Apr. 2, 2014

(87) PCT Pub. No.: WO2012/173923
PCT Pub. Date: Dec. 20, 2012

(65) Prior Publication Data
US 2014/0283664 A1    Sep. 25, 2014

Related U.S. Application Data

(60) Provisional application No. 61/497,198, filed on Jun. 15, 2011.

(51) Int. Cl.
*B65H 75/18* (2006.01)
*B23P 19/00* (2006.01)
(Continued)

(52) U.S. Cl.
CPC ........... *B65H 49/205* (2013.01); *B23P 19/00* (2013.01); *B65H 75/14* (2013.01); *B65H 75/18* (2013.01);
(Continued)

(58) Field of Classification Search
CPC ...... B65H 75/22; B65H 49/205; B65H 75/18; B65H 2701/355; B65H 75/32;
(Continued)

(56) References Cited

U.S. PATENT DOCUMENTS 3,041,005 A * 6/1962 Wallace ................. B65H 75/22
242/118.61
3,428,929 A * 2/1969 Brown ................. H03H 7/0184
242/118.41

(Continued)

FOREIGN PATENT DOCUMENTS

CA          2839198 A1    12/2012
JP          S63-68776 U    5/1988
(Continued)

OTHER PUBLICATIONS

International Search Report dated Oct. 2, 2012.
(Continued)

*Primary Examiner* — Ghassem Alie
(74) *Attorney, Agent, or Firm* — Baker & Hostetler LLP

(57) ABSTRACT

A filament dispenser includes a spool, hub, and an axle. The axle is laterally movable from a first position to a second position. The axle is independently rotatable with respect to the spool. In the extended position, the axle may be attached to a second spool, forming an assembly of operably-coupled filament dispensers. In the assembly, the connected spools are independently rotatable.

12 Claims, 5 Drawing Sheets

(51) Int. Cl.
  *B65H 75/00* (2006.01)
  *B65H 49/20* (2006.01)
  *B65H 75/22* (2006.01)
  *B65H 75/14* (2006.01)
  *B65H 75/32* (2006.01)

(52) U.S. Cl.
  CPC ............. *B65H 75/22* (2013.01); *B65H 75/32* (2013.01); *B65H 2701/355* (2013.01); *B65H 2701/534* (2013.01); *Y10T 29/49826* (2015.01); *Y10T 83/896* (2015.04); *Y10T 83/902* (2015.04)

(58) Field of Classification Search
  CPC . B65H 2701/534; B23P 19/00; Y10T 83/896; Y10T 29/49826; Y10T 83/902; G02B 6/4457; G02B 6/3897; G02B 6/4453; G02B 6/4465
  USPC ..... 83/650, 649; 29/428; 242/600, 590, 594, 242/594.5
  See application file for complete search history.

(56) References Cited

U.S. PATENT DOCUMENTS

| | | | |
|---|---|---|---|
| 3,430,886 A | | 3/1969 | Sweeney |
| 4,998,685 A | * | 3/1991 | Spencer ................. A01K 89/00 206/409 |
| 5,354,012 A | | 10/1994 | Vincent |
| 5,490,624 A | * | 2/1996 | Yavitz ................... A01K 89/00 225/34 |

FOREIGN PATENT DOCUMENTS

| | | |
|---|---|---|
| JP | S63-151766 U | 10/1988 |
| JP | H2-52572 U | 4/1990 |
| JP | 2000-32894 A | 2/2000 |
| JP | 2004 321078 | 11/2004 |

OTHER PUBLICATIONS

International Application No. PCT/US2012/041866: International Preliminary Report on Patentability dated Dec. 17, 2013, 30 pages.

* cited by examiner

FILAMENT DISPENSER

CROSS REFERENCE TO RELATED APPLICATIONS

This application is a National Stage Application filed under 35 U.S.C. 371 of International Application No. PCT/US2012/041866 filed Jun. 11, 2012, which claims the benefit of U.S. Provisional Patent Application No. 61/497,198 filed Jun. 15, 201.

BACKGROUND

The present invention relates to bobbins or spools upon which filamentary materials may be wound and, more specifically, to spools which may be detachably secured in coaxial, side-by-side relation. The invention is of particular utility in storing and dispensing filamentary fishing tackle.

It is often desirable for a person working with fishing line, leader, tippet material, etc. to have several sizes or weights of such items available for convenient dispensing in a common location. To this end, a number of winding means have been proposed which involve the coaxial, side-by-side mounting of a plurality of spools or bobbins, each carrying a different size, weight or type of filamentary tackle. Some of these arrangements, such as that of Spencer U.S. Pat. No. 4,998,685, provide a spindle extending through central openings in a plurality of spools. Others, such as that of Sweeny U.S. Pat. No. 3,430,886, involve a structure on the spool itself which cooperatively engages a structure on another, identical spool to releasably attach two or more of the spools in independently rotatable, coaxial, side-by-side relation. Vincent (U.S. Pat. No. 5,354,012) discloses a spool for rotatable, releasable attachment to identical spools.

There exists a need for spools that are easy to carry, use, and organize.

SUMMARY

In a first aspect, the present disclosure provides a filament dispenser. The filament dispenser can comprise a spool and an axle. The spool can comprise a first side, a second side, and a hub. The hub can have two or more axle-engagement structures. The axle can comprise a first end, a second end, an axis of rotation, and two or more hub-engagement structures. The axle and hub can be configured to releasably engage in two or more operational positions. In any of the operational positions, the spool can be independently rotatable with respect to the axle.

In any of the above embodiments, the hub further can comprise a plurality of spaced-apart hub segments. In any of the above embodiments, the axle further can comprise a through-hole aligned with the axis of rotation. In any of the above embodiments, in a first operational position, the first and second ends of the axle can be substantially level with the first and second sides of the spool. In any of the above embodiments, in a second operational position, the first end of the axle can project out of the hub on the first side of the spool and the second end of the axle can be recessed in the hub on the second side of the spool. In any of the above embodiments, the filament dispenser further can comprise a filament cutter. In any of the above embodiments, the filament cutter can be integrated into a sidewall of the spool.

In a second aspect, the present disclosure provides a method of assembling a plurality of filament dispensers. The method can comprise providing first and second filament dispensers, the first dispenser having a first axle and a first hub, the second dispenser having a second axle and a second hub. The first axle can have a first axis of rotation and the second axle can have a second axis of rotation. The first axle can be operably attached to the first hub and the second axle can be operably attached to the second hub. The first axle can be configured to move longitudinally along the first axis of rotation from a first operational position to a second operational position and the second axle can be configured to move longitudinally along the second axis of rotation from a third operational position to a fourth operational position. The method further can comprise moving the first axle from the first position to the second position, moving the second axle from the third position to the fourth position, and operably engaging the first axle simultaneously with the first hub and the second hub. In any embodiment of the method, engaging the first axle with the second hub further can comprise engaging a structure on the first axle with a complementary structure on or in the second hub.

In a third aspect, the present disclosure provides a method of dispensing filament. The method can comprise providing a dispenser comprising an axle and a spool with filament wound thereon, the filament having a free end. The axle and spool can have a shared axis of rotation. The method further can comprise holding the axle to prevent rotational movement of the axle around the axis of rotation and pulling the free end of the filament.

In a fourth aspect, the present disclosure provides a filament-dispensing assembly. The assembly can comprise first and second dispensers. The first and second dispensers each can comprise a spool comprising a hub and a laterally-moveable axle. The axle of the first dispenser can be operably-engaged with both the hub of the first dispenser and the hub of the second dispenser. The spools of each of the first and second dispensers can be both independently rotatable with respect to the axle of the first dispenser and/or the axle of the second dispenser of the assembly. In any embodiment of the assembly, the hub of the first dispenser and/or the hub of the second dispenser further can comprise a plurality of hub elements. In any embodiment of the assembly, the assembly further can comprise an axis of rotation, wherein the axle of the first dispenser and the axle of the second dispenser each further comprises a through-hole aligned with the axis of rotation. In any embodiment of the assembly, the through-hole in the axle of the first dispenser and the axle of the second dispenser each is centered along the axis of rotation. In any of the above embodiments of the assembly, at least one of the first or second filament dispensers further can comprise a filament cutter. In any of the above embodiments of the assembly, the filament cutter can be integrated into a sidewall of the spool of the at least one of the first or the second spool.

In a fifth aspect, the present disclosure provides a filament dispenser comprising a spool operably engaged with an axle. The spool and the axle can have a common axis of rotation. The axle can be longitudinally movable from a first position to a second position, relative to the spool, along the axis of rotation.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims.

As used herein, "a," "an," "the," "at least one," and "one or more" are used interchangeably. Thus, for example, a dispenser can be interpreted to mean "one or more" dispensers.

The term "and/or" means one or all of the listed elements or a combination of any two or more of the listed elements.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Additional details of these and other embodiments are set forth in the accompanying drawings and the description below. Other features, objects and advantages will become apparent from the description and drawings, and from the claims.

DETAILED DESCRIPTION

Figure 1:
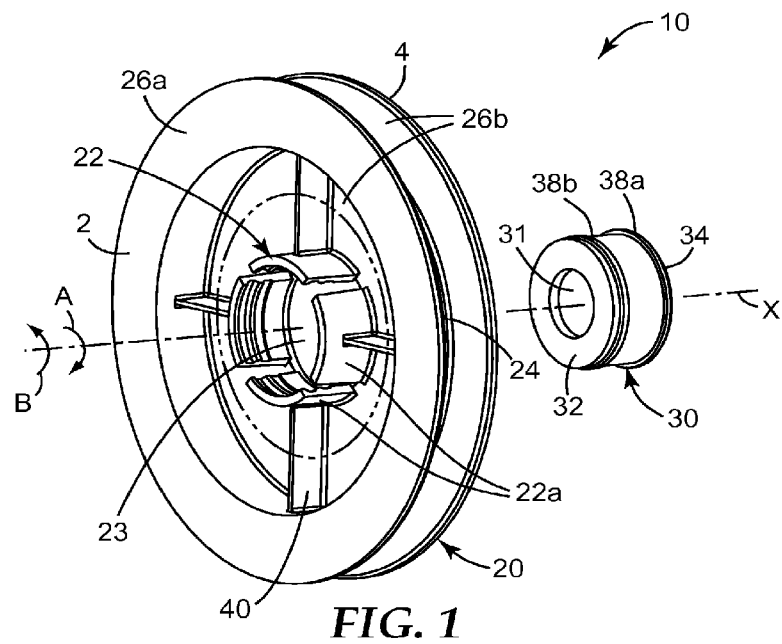
FIG. 1 is an exploded perspective view of one embodiment of a dispenser according to the present disclosure.

The present disclosure relates to articles for dispensing filaments. "Filaments" is used herein in the broadest sense and includes, for example, monofilament materials (e.g., fishing line), braided filaments (e.g., thread, fishing line), wire, and the like. In particular, the present disclosure relates to articles for dispensing filaments used for fishing line.

Some commercially-available spools for dispensing fishing line are made with non-identical sides. The spools have a first side, with an integral hub extending therefrom and a second side with an opening configured to detachably receive the hub from a second spool. In this fashion, two or more spools may be connected together by inserting the hub of a first spool into the opening of the second spool. One drawback of this design is that the hub is permanently extended from first side of the spool and, thus, the first side of the spool is not flat. Additionally, the spool is unable to rotate independently of the hub.

Dispensing filament from the spool is accomplished by pulling filament while insecurely holding the spool with fingers or by inserting an object through the hub. If the user grasps the hub too securely, the filament will not unwind smoothly, if the user grasps the hub too lightly, the spool may fall from the user's grasp. Holding the spool by inserting an object through the hub is also an insecure and somewhat cumbersome method. In addition, the permanently extended hub may catch or snag on loose fabric or on other fishing tackle. Further, these spools are only able to lay flat on the side which doesn't have the extended hub. When laid on the opposite side, the hub does not allow the spool to lay flat. This may make organization of the spools more difficult, either in a tackle box or on a store shelf. Retailers are limited in how to display these spools for sale. If retailers would like to stack the spools on a shelf, one on top of another, they must connect one spool to another. Thus the consumer must detach one spool from the remaining stack.

The present invention solves these aforementioned problems by utilizing a 2-piece dispenser. An axle, which operably engages with the hub of a spool, is movable from a first operational position (i.e., a "non-extended" position where the outer edges of the axle do not generally extend beyond the walls of the spool) position to a second operational position (i.e., an "extended" position where an outer edge of the axle extends outward from the spool to an extend where it is capable of engaging a second spool). "Operably engages", "operably engaged", and the like, as used herein, means that complementary structures disposed on or in the axle and the spool are coupled to each other such that, in the absence of a sufficient external force applied to move the axle in a lateral direction along an axis of rotation shared by both the axle and the spool, the position on the axis of rotation of the axle relative to the spool is substantially fixed. When "operably engaged", both the axle and the spool have a common axis of rotation and both are free to rotate, independently of the other, about the axis of rotation.

When the axle is in the first operational position, the possibility of the axle catching on loose fabric or fishing tackle is reduced. In addition, when a plurality of the inventive spools are configured with the axle in the first position, the spools may be stacked one on top of another without connecting one spool to another. Further, the axle is independently rotatable with respect to the spool, which allows for trouble-free filament dispensing. With the axle in the extended position, one spool may become engaged with (i.e., connected to) another spool to improve the organization of a plurality of filament dispensers.

FIG. 1 shows an exploded perspective view of a first side 2 of one embodiment of a filament dispenser 10 according to the present disclosure. The dispenser 10 comprises a spool 20 and an axle 30. The spool 20 comprises a cylindrical drum 24 onto which a filament (not shown) is wound and a concentrically-positioned cylindrical hub 22 attached thereto. The spool 20 includes two sidewalls 26a and 26b that extend outward from the surface of the drum 24, thereby creating a space in which to hold filament (not shown) in the drum 24. One of the sidewalls (26b) optionally extends inward from the drum 24 to the hub 22, thereby providing structural support to maintain the hub 22 at a substantially fixed position relative to the spool 20 and providing a relatively large, substantially planar surface on which to apply labels and the like (not shown).

Both the spool 20 and the axle 30 can be formed from a variety of materials, although at least one of the spool 20 or the axle 30 must include a portion that is elastically deformable, as described below. Nonlimiting examples of materials from which to make the spool 20 and axle 30 include polymeric materials (e.g., acrylonitrile butadiene styrene, polystyrene, HDPE, LDPE, and the like), metal, wood, and/or rubber. In any embodiment, the spool 20 and the axle 30 can be made from the same material. In some embodiments, the spool 20 and the axle 30 can be made from different materials. Either the spool 20 and/or the axle 30 may be formed in a plurality of segments (e.g., halves), which are joined by means that are known in the art such as, for example, an adhesive, a thermal bond, an ultrasonic weld, and/or a fastener.

The cylindrical hub 22 may comprise a plurality of spaced-apart hub segments 22a as shown in FIG. 1. Alternatively, the hub 22 may comprise a singular unsegmented cylindrical structure (not shown). The hub 22 or hub segments 22a form an opening 23 capable of receiving the axle 30. The hub 22 (or each individual hub segment 22a) is joined to the drum 24 via at least one rib 40. Ribs 40 can be configured in a variety of shapes (e.g., cuboid, pyramidal frustum, conical frustum, ellipsoid, or cylinder) and hold the drum 24 in a substantially fixed position relative to the hub 22. Optionally, one or more of the ribs 40 may be attached to at least one of the sidewalls 26b, as shown in FIG. 1.

Figure 2:
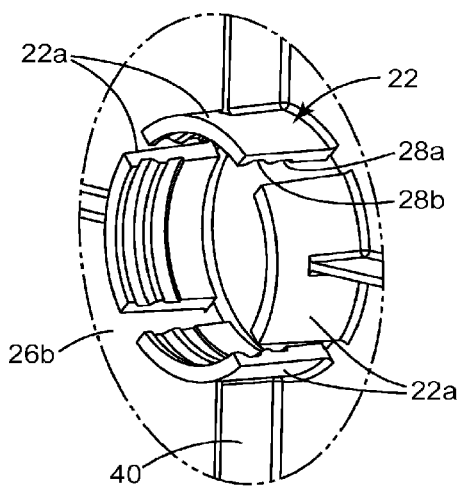
FIG. 2 is perspective view of the hub region of the dispenser of FIG. 1.

The hub 22, shown in detail in FIG. 2, comprises a plurality of axle-engagement structures (28a and 28b). In the illustrated embodiment, the axle-engagement structures (28a and 28b) comprise indentations, channels, or grooves in the hub segments 22a that, together, form at least two separate channels circumscribing the interior surface of the hub 22. Each axle-engagement structure is capable of releasably engaging a complementary-shaped hub-engagement structure (38a and 38b) located on the axle 30.

The spool 20 further comprises an axis of rotation X around which the drum 24 may rotate in one direction (e.g., clockwise, denoted by arrow A) to receive the filament (not shown) or it may rotate in the opposite direction (e.g., counterclockwise, denoted by arrow B) to dispense the filament (not shown).

The axle 30 has a first end 32, a second end 34 opposite the first end 32, and an optional through-hole 31. Advantageously, the through-hole 31 permits the insertion, for example, of a rod or a wire (not shown) to allow convenient secural and/or storage of one or more dispensers 10. The axle 30 is movably engaged to the spool 20. The axle 30 is engaged to the spool 20 via hub-engagement structures 38a and 38b. In the illustrated embodiment, the hub-engagement structures 38a and 38b comprise raised features (e.g., a bump, a projection, a ridge-like structure) that extend outward from, the axle 30 around the entire circumference of the axle 30. It is contemplated that, instead of a continuous projection along the entire circumference of the axle, the hub-engagement structure could alternatively comprise one or more smaller projections (not shown) configured to provide continuous engagement with an axle-engagement structure as the spool and/or the axle completes a rotation around the axis of rotation.

The axle 30 is movable with respect to the spool 20 in a plurality of directions. First, the axle 30 is independently rotatable with respect to the spool 20 in both directions (e.g., clockwise and counterclockwise) around the axis of rotation X. That is, if the spool 20 is held stationary, the axle 30 can move rotationally clockwise and/or counterclockwise about the axis of rotation X. Further, if the spool 20 is rotated about the axis of rotation X, the axle 30 can be held immobile or it can rotate about the axis of rotation X simultaneously in the same, or opposite direction; and at the same or at a different rotational velocity; as the spool 20. Second, the axle 30 can move longitudinally along the axis of rotation X, with respect to the spool 20, as described hereinbelow.

Figure 3A:
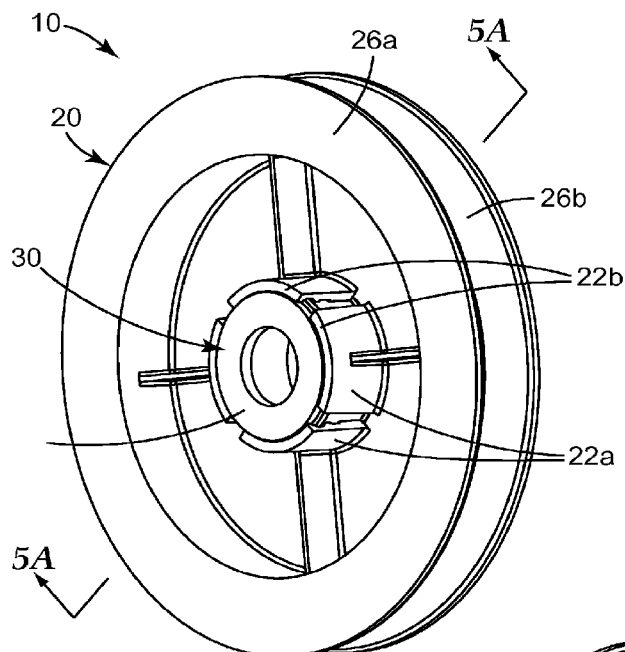
FIGS. 3A-B are perspective views of the first and second sides, respectively, of the assembled dispenser of FIG. 1 with the movable axle in a first operational position.
Figure 3B:
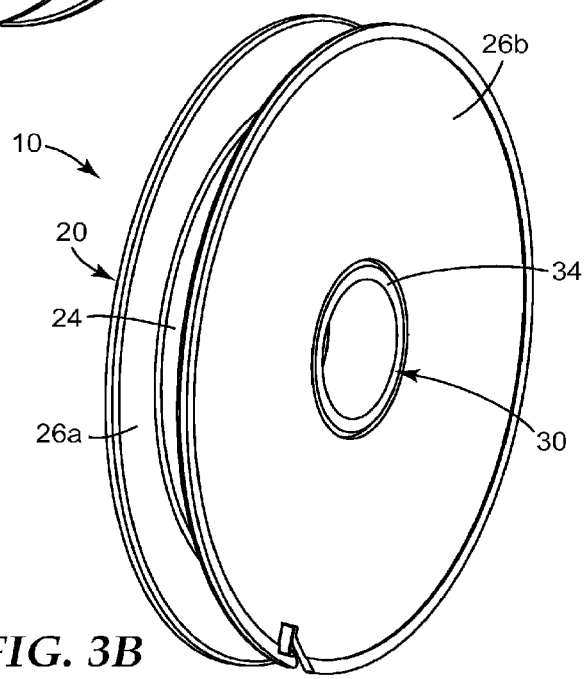

FIGS. 3A and 3B show perspective views of the first side 2 and second side 4, respectively, of the assembled filament dispenser 10 of FIG. 1. In the illustrated embodiment, the axle 30 is disposed in a first operable position relative to the spool 20. In the first operable position, the first end 32 of the axle 30 is substantially level with the edges 22b of the hub segments 22a and the second end 34 of the axle 30 is substantially level with the sidewall 26b of the spool 20. In the first operable position, both the spool 20 and the axle 30 can freely rotate, independent of each other, around the axis of rotation X shown in FIG. 1.

Figure 4:
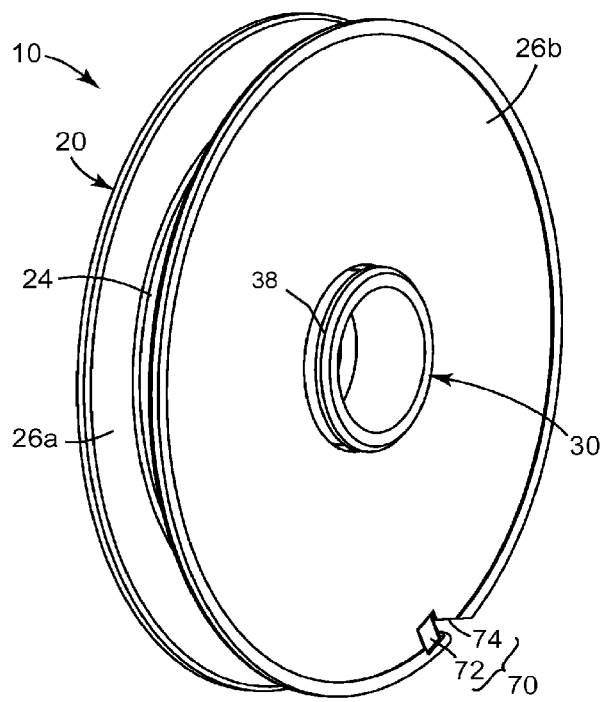
FIG. 4 is a perspective view of the second side of the assembled dispenser of FIG. 1 with the axle in a second operational position.

FIG. 4 shows a perspective view of the second side 4 of the assembled filament dispenser 10 of FIG. 1 with the axle 30 disposed in a second operable position. In the second operable position, the axle 30 projects outward along the axis of rotation X from the opening 24 in the spool 20, thereby exposing a hub-engagement structure 38. Also shown in FIG. 4 is an optional filament cutter 70. The illustrated filament cutter 70 is integrated into the sidewall 26 b of the spool 20. Alternatively, the filament cutter could be integrated into the opposite sidewall of the spool (not shown). The filament cutter 70 comprises a cutting surface 72 (e.g., a metal blade) that is recessed (e.g., disposed in a slit 74) in the sidewall 26 b. In some embodiments, the cutting surface 72 can be attached to the sidewall 26 b via an adhesive or a fastener (not shown), for example.

Detailed views of the structural relationships between the spool 20 and the axle 30 in each of the first and second operable positions are shown in FIGS. 4 and 5, respectively.

Figure 5A:
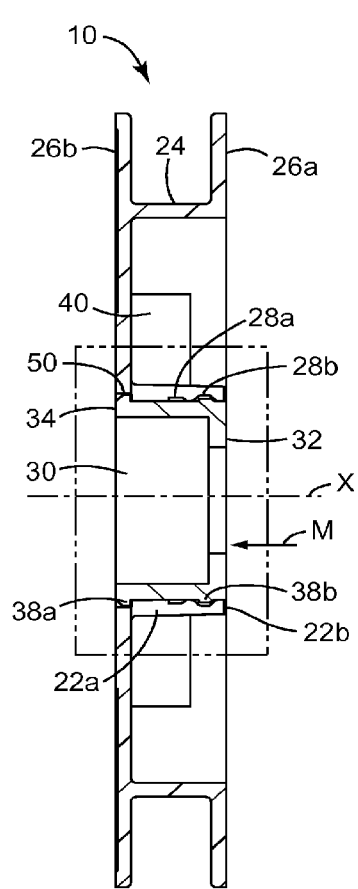
FIGS. 5A-C are cross-sectional side view of the assembled dispenser of FIG. 1 with the movable axle disposed in three distinct positions.
Figure 5B:
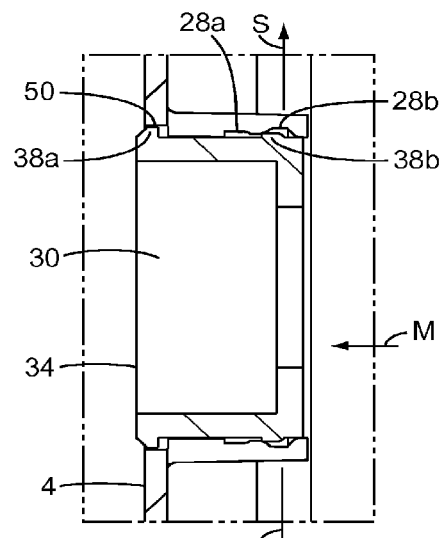
Figure 5C:
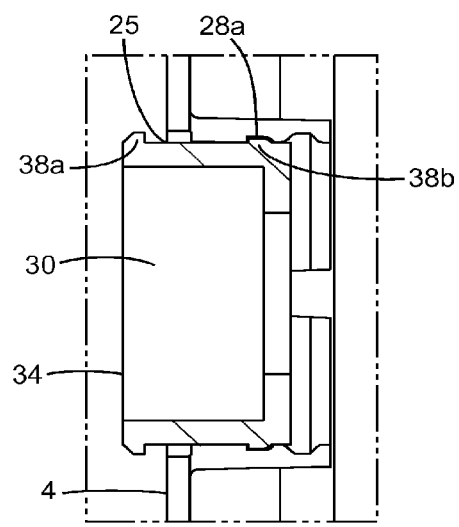

FIG. 5A-C show a cross-sectional views of the assembled filament dispenser 10 of FIG. 1 as the axle 30 transitions from the first operable position (FIG. 5A) through an intermediate position (FIG. 5B) to the second operable position (FIG. 5C). FIG. 5A shows the axle 30 disposed in the spool 20 in the first operable position, where the first end 32 and second end 34 are substantially level with the edges 22b of the hub segments 22a. Advantageously, in the first operational position, both sides of the spool are capable of lying flat on a substantially flat surface. Thus, a plurality of filament dispensers having their respective axles in the first operational position can be superimposed to for a substantially stable and level stack of dispensers, without the need for additional packaging to form a flat, stackable surface. Additionally, in the first position, the axle is unlikely to catch on loose fabric or loose fishing gear in a tackle box.

FIG. 5A also shows the relative locations of the axis of rotation X, drum 24, sidewalls 26a and 26b, ribs 40, first and second axle-engagement structures 28a and 28b, and first and second hub-engagement structures 38a and 38b. It is noted that, in the illustrated first operational position, the first hub-engagement structure 38a is disposed in a notch 50 in the spool 20, while the second hub-engagement structure 38b is disposed in a first axle-engagement structure 28a. In this position, the walls of the groove that forms the first axle-engagement structure 28a confine the second hub-engagement structure 38b, substantially prevent unintentional movement of the axle 30 relative to the spool 20 longitudinally along the axis of rotation X. However, when the axle 30 is urged (e.g., by finger pressure) in the direction denoted by arrow M, the axle 30 can slideably move to the second operational position, shown in FIG. 5C.

FIG. 5B shows a detailed cross-sectional view of the axle 30 as it slideably moves in the direction M between the first operable position and the second operable position. In comparison to FIG. 5A, it can be seen in FIG. 5B that the first hub-engagement structure 38a is moving out of the notch 50 into a position where the second end 34 of the axle 30 is no longer level with the second side 4 of the spool. Without being bound by theory, this slideable movement can be achieved by at least one of several mechanisms. For example, either the axle 30 and/or the spool 20 may be constructed from an elastically-deformable material (e.g., rubber or plastic) that temporarily deforms under pressure to allow the movement of the axle 30 into the second operational position. Alternatively, or additionally, as the axle 30 is urged in the direction of arrow M, pressure from the second hub-engagement structure 38*b* against the sloped wall of the second axle-engagement structure 28*b* may cause the hub segments 22*a* to elastically deflect in the respective directions designated by arrows S (as shown in FIG. 5B) until the second hub-engagement structure 38*b* becomes seated into the groove of the first axle-engagement structure 28*a*. The plurality of spaced-apart hub segments 22*a* of the illustrated embodiment result in a hub that is less rigid (i.e., more flexible) than a unitary hub (not shown), advantageously permitting the use of significantly less force to move the axle from the first operational position to the second operational position.

FIG. 5C shows a detailed cross-sectional view of the axle 30 disposed in the spool 20 in a second operational position. It is noted that, in this position, the second hub-engagement structure 38*b* is disposed in the groove formed by the second axle engagement structure 28*b*. In the second operational position, the second end 34 of the axle 30 is not level with the second side 4 of the spool. Rather, the second end 34 projects outward from the opening 25, thereby placing the first hub-engagement structure 38*a* in an exposed position where it can operably engage with an axle-engagement structure of a second filament dispenser, as shown in FIGS. 6-7.

The present disclosure provides an assembly comprising a plurality of operably-engaged filament dispensers. The filament dispensers comprise filament dispensers having a laterally-movable axle, as described herein. In this embodiment, first and second filament dispensers are coupled adjacently via the movable axle of one of the first filament dispenser. A third filament dispenser may be coupled adjacent the second filament dispenser via the movable axle of the second filament dispenser. Additional filament dispensers can be engaged to either side of the multi-dispenser assembly as desired.

Figure 6:
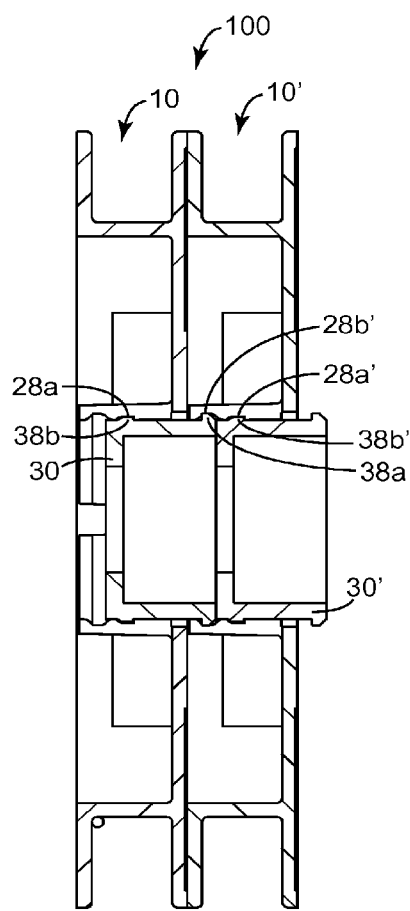
FIG. 6 is a cross-sectional side view of one embodiment of an assembly comprising two operably-engaged filament dispensers according to the present disclosure.

FIG. 6 shows a cross-sectional view of one embodiment of an assembly 100 of two operably-engaged filament dispensers according to the present disclosure. In this embodiment, two filament dispensers (10 and 10', respectively) are operably engaged via the axle 30 of dispenser 10. As shown in FIG. 6, the axles (30 and 30') of both filament dispensers are disposed in the second operable position. Further, the first hub-engagement structure 38*a* of dispenser 10 is releasably engaged in the second axle-engagement structure 28*b'* of dispenser 10', thus releasably coupling the first filament dispenser 10 to the second filament dispense 10'. In this operable configuration, the second hub-engagement structure 38*b* is releasably engaged in the first axle-engagement structure 28*a* of dispenser 10 and the second hub-engagement structure 38*b'* of dispenser 10' is releasably engaged in the first axle-engagement structure 28*a'* of dispenser 10'. Advantageously, in this operable configuration, both spools 20 and 20' can rotate independently, in the same or in opposite directions, around the axle 30.

Figure 7:
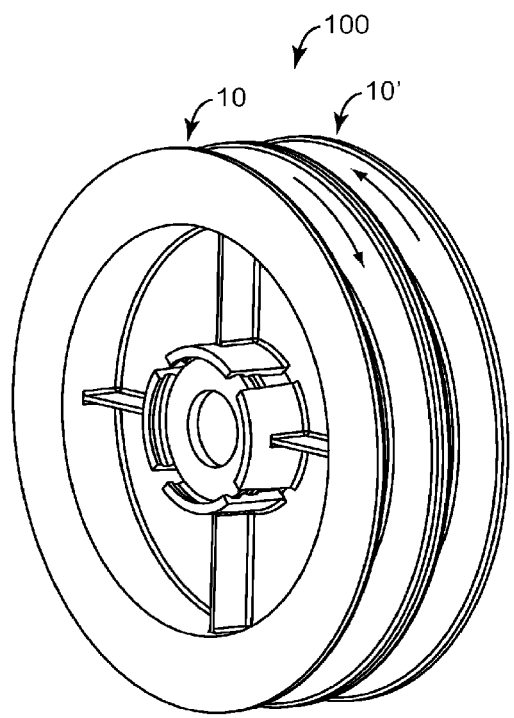
FIG. 7 is a perspective view of the assembly of FIG. 6.

FIG. 7 shows a perspective view of the multi-dispenser assembly 100 of FIG. 6, with arrows indicating that filament dispenser 10 and filament dispenser 10' are independently rotatable. The filament dispensers (10 and 10') can be operably engaged as shown in FIG. 7 using one of several techniques. In one embodiment, the axle (30 and 30') of both filament dispensers are moved, if necessary, from the first position (see FIG. 3) to the second position (see FIG. 4) by applying pressure (e.g., finger pressure) to the first end of each axle to urge each axle into the second position. Subsequently, while holding the second spool immobile, the protruding first end of the axle of the first dispenser is positioned adjacent the first side of the second dispenser, aligned with and proximate the hub of the second dispenser, and the axle of the first dispenser is urged (e.g., by finger pressure) until the first hub-engagement structure of the first dispenser is releasable engaged in the second axle-engagement structure of the second dispenser. In an alternative embodiment, two filament dispensers, each with its respective axle disposed in the first position relative to the spool, are positioned side-by-side with the hubs aligned and with the second side of the first dispenser facing the first side of the second dispenser. Pressure (e.g., finger pressure) is applied to the first end of the axle of the first dispenser, thereby simultaneously urging the axle of the first dispenser into the second position and causing the second end of the axle of the first dispenser to move the axle of the second dispenser into the second position and to releasably engage the spool of the second dispenser to the axle of the first dispenser. A person of ordinary skill in the art will recognize other possible techniques to operably engage two or more filament dispensers. Dispensers may be easily detached from the multi-dispenser assembly by applying pressure (e.g., finger pressure to the second end of the axle to move the axle into the first operable position, thereby displacing any other axle that was releasably engaged in the hub.

Advantageously, the multi-dispenser assembly described herein permits easy withdrawal of a number of different sizes or weights of filamentary materials from a like number of detachably connected dispensers. The dispensers need not be identical in size as shown in FIGS. 6 and 7 as long as their respective hubs and axles are similarly shaped and dimensioned such that they are capable of connecting together as shown and described herein.

Dispensing filament from the spool may be accomplished, for example, by securing the axle in a non-rotatable position while pulling on the free end of a filament wound on the drum of the spool. Securing the axle may be accomplished, for example, with the use of the operator's hand, a clamp, or a bolt, depending on how the operator chooses to carry an individual dispenser or a multi-dispenser assembly. In addition, it is not necessary to insert an object through the axle in order to dispense filament.

Although the illustrated embodiments show axles comprising hub-engagement structures having raised features (e.g., ridges) and a hub having axle-engagement structures comprising recessed features (e.g., indentations, channels or grooves), it is contemplated that a filament dispenser may alternatively include an axle comprising hub-engagement structures having recessed features and a hub having axle-engagement structures comprising raised features.

Embodiments

Embodiment 1 is a filament dispenser, comprising:
    a spool comprising a first side, a second side, and a hub;
        the hub having two or more axle-engagement structures; and
    an axle comprising a first end, a second end, an axis of rotation, and two or more hub-engagement structures;
        wherein the axle and hub are configured to be operably engaged in two or more operational positions; and wherein in any of the operational positions, the spool is independently rotatable with respect to the axle.

Embodiment 2 is the filament dispenser of Embodiment 1 wherein the hub further comprises a plurality of spaced-apart hub segments.

Embodiment 3 is the filament dispenser of Embodiment 1 or Embodiment 2, wherein the axle further comprises a through-hole aligned with the axis of rotation.

Embodiment 4 is the filament dispenser of Embodiment 3, wherein the through-hole is centered along the axis of rotation.

Embodiment 5 is the filament dispenser of any one of the preceding Embodiments wherein, in a first operational position, the first and second ends of the axle are substantially level with the first and second sides of the spool.

Embodiment 6 is the filament dispenser of any one of the preceding Embodiments, wherein, in a second operational position, the first end of the axle projects out of the hub on the second side of the spool and the first end of the axle is recessed in the hub on the first side of the spool.

Embodiment 7 is the dispenser of any of the preceding Embodiments, wherein the axle-engagement structure comprises an indentation, a channel, or a groove.

Embodiment 8 is the dispenser of any of the preceding Embodiments, wherein hub-engagement structure comprises a raised feature.

Embodiment 9 is the dispenser of any one of the preceding Embodiments, further comprising a filament cutter.

Embodiment 10 is the dispenser of Embodiment 9, wherein the filament cutter is integrated into a sidewall of the spool.

Embodiment 11 is a method of assembling a plurality of filament dispensers, comprising:
  providing first and second filament dispensers, the first dispenser having a first axle and a first hub, the second dispenser having a second axle and a second hub;
    wherein the first axle has a first axis of rotation and the second axle has a second axis of rotation;
    wherein the first axle is operably attached to the first hub and the second axle is operably attached to the second hub;
    wherein the first axle can be moved longitudinally along the first axis of rotation from a first operational position to a second operational position and the second axle can be moved longitudinally along the second axis of rotation from a third operational position to a fourth operational position;
  moving the first axle from the first position to the second position;
  moving the second axle from the third position to the fourth position; and
  operably engaging the first axle simultaneously with the first hub and the second hub.

Embodiment 12 is the method of Embodiment 11, wherein engaging the first axle with the second hub further comprises engaging a structure on the first axle with a complementary structure on or in the second hub.

Embodiment 13 is the method of Embodiment 11 or 12, wherein the structure on the first axle comprises a raised feature and the complementary structure in the second hub comprises an indentation, a channel, or a groove.

Embodiment 14 is the method of Embodiment 11 or 12, wherein the structure on the first axle comprises an indentation, a channel, or a groove; and the complementary structure in the second hub comprises a raised feature.

Embodiment 15 is a method of dispensing filament comprising the steps of:
  providing a dispenser comprising an axle and a spool with filament wound thereon, wherein the filament has a free end, wherein the axle and spool have a shared axis of rotation;
  holding the axle to prevent rotational movement of the axle around the axis of rotation; and
  pulling the free end of the filament.

Embodiment 16 is a filament-dispensing assembly comprising:
  first and second dispensers;
    wherein the first and second dispensers each comprises a spool comprising a hub and a laterally-moveable axle;
    wherein the axle of the first dispenser is operably-engaged with both the hub of the first dispenser and the hub of the second dispenser; and
    wherein the spools of each of the first and second dispensers are both independently rotatable with respect to the axle of the first dispenser and/or the axle of the second dispenser of the assembly.

Embodiment 17 is the filament-dispensing assembly of Embodiment 16, wherein the hub of the first dispenser and/or the hub of the second dispenser further comprises a plurality of hub elements.

Embodiment 18 is the filament-dispensing assembly of Embodiment 16 or Embodiment 17, wherein the assembly further comprises an axis of rotation, wherein the axle of the first dispenser and the axle of the second dispenser each further comprises a through-hole aligned with the axis of rotation.

Embodiment 19 is the filament-dispensing assembly of any one of Embodiments 16 through 18, wherein the through-hole in the axle of the first dispenser and the axle of the second dispenser each is centered along the axis of rotation.

Embodiment 20 is the filament-dispensing assembly of any one of Embodiments 16 through 19, further comprising a filament cutter.

Embodiment 21 is the filament-dispensing assembly of Embodiment 20, the filament cutter is integrated into a sidewall of the spool of the at least one of the first or the second spool.

Embodiment 22 is a filament dispenser comprising a spool operably engaged with an axle;
  wherein the spool and the axle have a common axis of rotation
  wherein the axle is longitudinally movable from a first position to a second position, relative to the spool, along the axis of rotation.

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

All headings are for the convenience of the reader and should not be used to limit the meaning of the text that follows the heading, unless so specified.

Various modifications may be made without departing from the spirit and scope of the invention. These and other embodiments are within the scope of the following claims.

The invention claimed is:

1. A filament dispenser, comprising:
a spool for holding a filament, said spool comprising a first side, a second side opposite the first side, and a hub disposed around an axis of rotation, the hub having a plurality of spaced-apart hub segments disposed around the axis of rotation and positioned between the first side and the second side, and two or more axle-engagement structures disposed on the plurality of spaced-apart hub segments, the plurality of spaced-apart hub segments forming an opening around the axis of rotation; and
an axle releasably engaged with the hub, said axle comprising a first end, and a second end opposite the first end along the axis of rotation, and two or more hub engagement structures that are releasably engaged with the plurality of spaced-apart hub segments of the hub, such that the axle is movable within the opening of hub along a longitudinal direction with respect to the axis rotation between a first operational position and a second operational position,
wherein the second operational position is where the first end of the axle projects out of the hub on the first side of the spool and the second end of the axle is recessed in the hub on the second side of the spool,
wherein in any one of the first operational position and the second operational position, the spool and the axle are independently rotatable with respect to each other about the axis of rotation.

2. The filament dispenser of claim 1, wherein the at least one axle further comprises a through-hole aligned with the axis of rotation.

3. The filament dispenser of claim 2, wherein the through-hole is centered along the axis of rotation.

4. The filament dispenser of claim 1, wherein in the first operational position, the first and second ends of the axle are substantially level with the first and second sides of the spool.

5. The dispenser of claim 1, wherein the axle-engagement structure comprises an indentation, a channel, or a groove.

6. The dispenser of claim 1, wherein hub-engagement structure comprises a raised feature.

7. The dispenser of claim 1, further comprising a filament cutter.

8. The filament dispenser of claim 1, wherein the spool is a first spool and the axle is a first axel, said filament dispenser further comprising a second spool, and a second axle; wherein the first axle is movable along the axis of rotation from the first operational position, to an intermediate position, and to the second operational position, relative to the first spool;
wherein in the second operational position the first axle of the first spool is engaged with the second spool such that the first spool and the second spool have contiguous sides.

9. The filament dispenser of claim 1, wherein the first operational position is where a first hub-engagement structure of the two or more hub-engagement structures is engaged with a first axle-engagement structure of the two or more axle-engagement structures, and the second operational position is where the first hub-engagement structure is engaged with a second axle-engagement structure of the two or more axle-engagement structures.

10. The filament dispenser of claim 1, wherein the two or more axle-engagement structures are disposed along the hub entirely between the first side and the second side in the first operational position.

11. The filament dispenser of claim 1, wherein the two or more hub-engagement structures are circumferentially disposed around the axis of rotation.

12. The filament dispenser of claim 1, wherein the two or more axle-engagement structures are circumferentially disposed around the axis of rotation.

* * * * *